(12) United States Patent
Naitoh

(10) Patent No.: US 10,125,674 B2
(45) Date of Patent: Nov. 13, 2018

(54) ENGINE

(75) Inventor: Ken Naitoh, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 727 days.

(21) Appl. No.: 13/703,200

(22) PCT Filed: Mar. 27, 2011

(86) PCT No.: PCT/JP2011/057486
§ 371 (c)(1),
(2), (4) Date: Dec. 10, 2012

(87) PCT Pub. No.: WO2011/155248
PCT Pub. Date: Dec. 15, 2011

(65) Prior Publication Data
US 2013/0087109 A1    Apr. 11, 2013

(30) Foreign Application Priority Data
Jun. 10, 2010    (JP) .................. 2010-133028

(51) Int. Cl.
F02B 41/00    (2006.01)
F02K 7/067   (2006.01)
F02K 7/20    (2006.01)

(52) U.S. Cl.
CPC .............. *F02B 41/00* (2013.01); *F02K 7/067* (2013.01); *F02K 7/20* (2013.01); *Y02T 50/671* (2013.01)

(58) Field of Classification Search
USPC ........ 123/26; 60/39.48, 39.6, 325, 520, 533, 60/595, 767, 247, 801, 768; 431/2, 11,
(Continued)

(56) References Cited

U.S. PATENT DOCUMENTS 2,003,293 A    6/1935  Holzwarth
2,587,073 A *  2/1952  Swartz ................... F02K 5/023
                                                  60/247
(Continued)

FOREIGN PATENT DOCUMENTS

JP    11-210554 A    8/1999
JP    11-229965 A    8/1999
(Continued)

OTHER PUBLICATIONS

International Search Report for PCT/JP2011/057486, mailing date of Jun. 14, 2011.

*Primary Examiner* — Hung Q Nguyen
*Assistant Examiner* — Ruben Picon-Feliciano
(74) *Attorney, Agent, or Firm* — Westerman, Hattori, Daniels & Adrian, LLP

(57) ABSTRACT

An engine without a compressor or a turbine comprises a combustion chamber for burning a fuel-air mixture formed by mixing a fuel with outside air; and an outside air introduction part for introducing outside air into the combustion chamber. The outside air introduction part comprises an intake main port for introducing outside air into the combustion chamber from the direction along the central axis of the combustion chamber and a plurality of intake sub-ports for introducing outside air into the combustion chamber from the direction toward the central axis. The intake sub-ports comprise ejection openings capable of ejecting outside air toward a collision point inside the combustion chamber. Streams of outside air ejected from the ejection openings of the intake sub-ports mutually collide at the collision point and are thereby compressed.

23 Claims, 11 Drawing Sheets

(58) Field of Classification Search
USPC ......... 431/12, 8, 9, 185, 198, 182, 187, 188, 431/156
See application file for complete search history.

(56) References Cited

U.S. PATENT DOCUMENTS

| | | | | |
|---|---|---|---|---|
| 2,677,232 | A * | 5/1954 | Collins | F02K 7/20 60/244 |
| 2,750,736 | A | 6/1956 | Holzwarth et al. | |
| 2,925,072 | A * | 2/1960 | Schmidt | 123/46 R |
| 3,245,457 | A * | 4/1966 | Smith | F23D 11/42 361/253 |
| 3,494,127 | A | 2/1970 | Brille | |
| 2004/0000134 | A1 | 1/2004 | Tew et al. | |
| 2005/0120700 | A1 | 6/2005 | Tangirala et al. | |
| 2007/0015099 | A1 | 1/2007 | Wiedenhoefer et al. | |
| 2010/0126140 | A1 | 5/2010 | Hucker et al. | |

FOREIGN PATENT DOCUMENTS

| | | | |
|---|---|---|---|
| JP | 2005-171984 | A | 6/2005 |
| JP | 2007-010308 | A | 1/2007 |
| JP | 2008-530450 | A | 8/2008 |
| JP | 2009-114998 | A | 5/2009 |
| WO | 2006/057577 | A1 | 6/2006 |

* cited by examiner

FIG.4
(A)
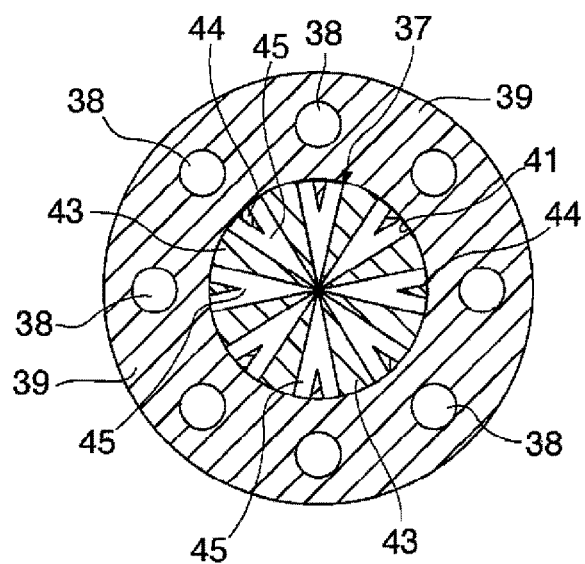
(B)
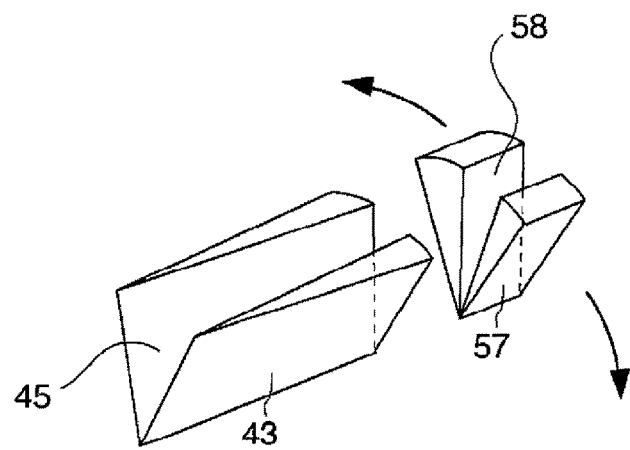

FIG.9
(A) 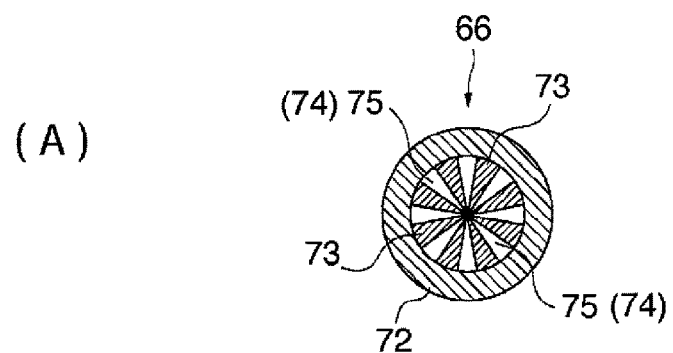
(B) 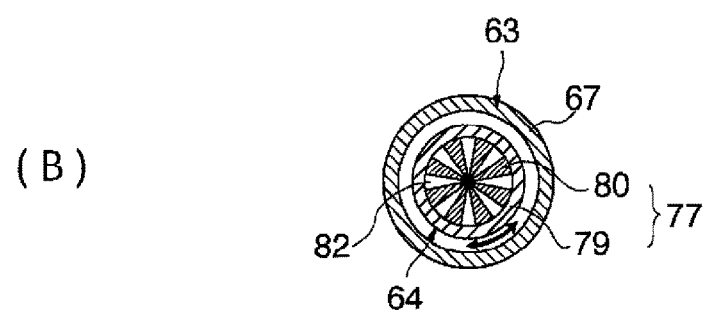
(C) 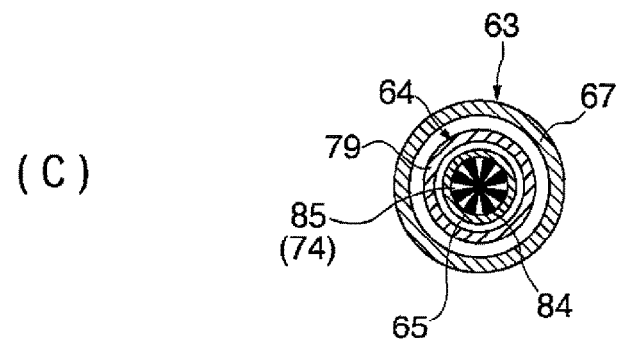

FIG.10
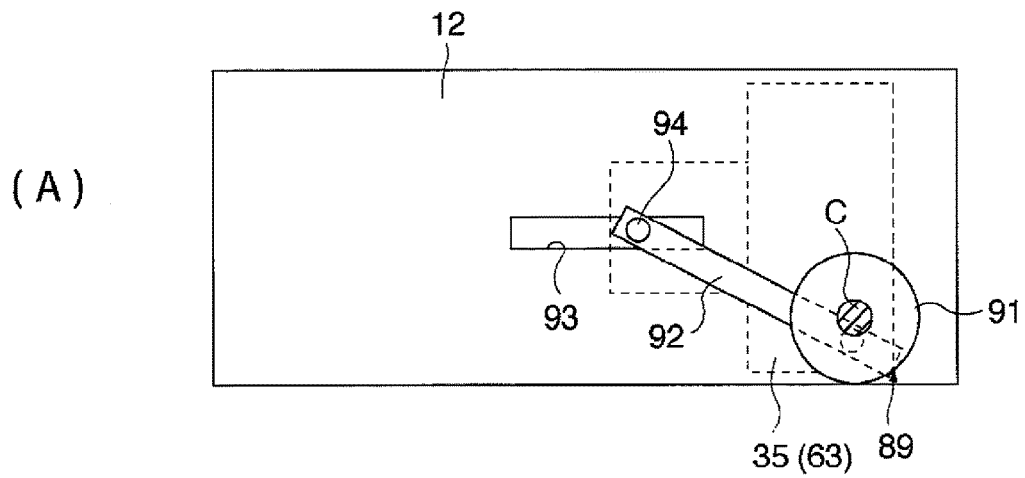
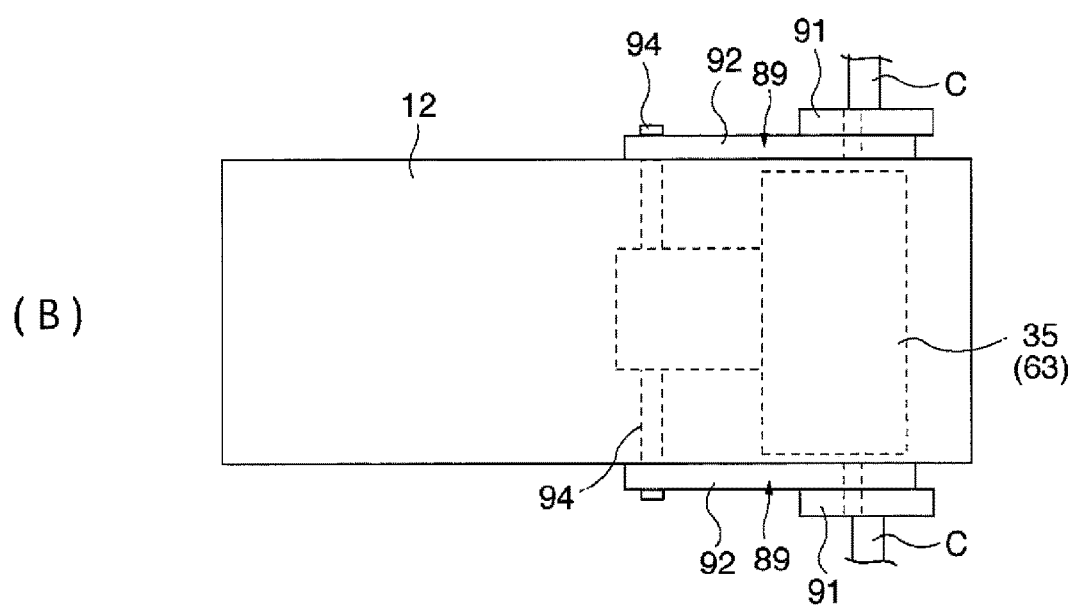

ENGINE

TECHNICAL FIELD

The present invention relates to an engine which can be applied to all speed ranges without being enlarged.

BACKGROUND ART

Conventional engines are roughly divided into three types: a reciprocating engine in which power is obtained by reciprocating motion of a piston caused by combustion of fuel; a jet engine in which thrust force is obtained by combusting a mixture of fuel and air compressed by using a compressor, and in which a turbine providing rotational power to the compressor is rotated by the combustion gas generated by the combustion; and a scram engine in which thrust force is obtained by supersonic combustion performed by spraying fuel into intake air compressed by ram pressure (see, for example, Patent Literature 1).

CITATION LIST

Patent Literature

Patent Literature 1: Japanese Patent Laid-Open No. 11-229965

SUMMARY OF INVENTION

Technical Problem

In many cases, the above-described engines of three types are used to provide power to movable bodies, such as an automobile and an airplane. However, the speed range of each of the movable bodies is restricted by the structure of the engine which can be applied to the movable body. Therefore, the speed ranges of the respective movable bodies cannot be covered by one engine. Here, the speed range, to which each of the engines can be applied, is higher in the order of the reciprocating engine, the jet engine, and the scram engine. In the reciprocating engine, the reciprocating motion of the piston is used, and hence the speed range covered by the conventional jet engine is difficult to be obtained by using the reciprocating engine. Further, in the jet engine, it is difficult to perform fine speed control, and hence the speed range covered by the conventional reciprocating engine is difficult to be obtained by using the jet engine. Further, in the scram engine, air needs to be introduced at supersonic speed, and hence the scram engine cannot be applied, as a single body, to a speed range not higher than the speed range covered by the jet engine. Therefore, the engines of these respective types need to be mounted to a movable body which moves in all the speed ranges so that it can travel like an automobile on the ground and can fly like an airplane in the air. This results in an increase in the size and weight of the movable body, which is not realistic.

Meanwhile, Patent Literature 1 discloses a jet engine provided with a reciprocating engine as a power source of a compressor, but the jet engine does not have a structure for securing a wide speed range.

Further, in the conventional jet engine structure, a compressor and a turbine are needed for compression of air, and hence, when the engines of respective types are combined with each other to cover a wide speed range, the compressor, the turbine, and the like, become serious obstacles in reducing the size and weight of the engine as a whole.

The present invention has been made in view of the above described problems. An object of the present invention is to provide an engine which can compress intake air by a structure configured to be simpler than the structure of a conventional jet engine by eliminating the use of a compressor, a turbine, and the like, and thereby can contribute to reduction in the size and weight of an apparatus as a whole.

Further, the present invention is to provide an engine which can cover a wide speed range without increase in the size of the apparatus as a whole.

Solution to Problem (1) In order to achieve the above described object, the present invention adopts an engine including a combustion chamber in which a mixture obtained by mixing fuel with outside air is combusted, and an outside air introduction part which introduces outside air into the combustion chamber, the engine being configured such that the outside air introduction part includes a plurality of ejection openings formed to be able to eject the outside air toward a fixed area in the combustion chamber, and has a compression function of compressing the outside air in the fixed area by making the streams of outside air ejected from the respective ejection openings collide with each other in the fixed area.

(2) Further, preferably, the engine further includes an operation control device configured to control the ejection condition of outside air from the ejection openings, and is configured such that the operation control device performs control of the ejection timing of outside air from each of the ejection openings so that the outside air is intermittently ejected from each of the ejection openings so as to intermittently generate colliding streams in the fixed area.

(3) Further, the engine can be configured such that the outside air introduction part includes an intake main port configured to guide outside air into the combustion chamber from a direction along a central axis of the combustion chamber, and intake sub-ports configured to guide outside air into the combustion chamber from the direction toward the central axis, and such that the ejection openings are provided to be able to eject the outside air from the intake sub-ports to the fixed area.

(4) Here, preferably, the engine is configured such that the intake sub-port is formed to have a passage sectional area gradually reduced toward the ejection openings.

(5) Further, the engine further includes an operation control device configured to operate predetermined members and to control the operations of the members, and can be configured such that the outside air introduction part further includes a main intake opening and closing member configured to open and close the intake main port, and a sub-intake opening and closing member configured to open and close the intake sub-ports, and such that the operation control device controls operations of the main intake opening and closing member and of the sub-intake opening and closing member so as to switch between the opened and closed states of the intake main port and of the intake sub-ports according to a required engine output.

(6) In this case, preferably, the engine is configured such that the operation control device controls operations of the main intake opening and closing member and of the sub-intake opening and closing member so as to intermittently switch between the opened and closed states of the intake sub-ports at a rate corresponding to a required engine output.

(7) Further, the engine further includes a piston capable of being operated to enable the capacity in the combustion chamber to be changed, and can also be configured such that the piston is provided to be movable in a first operation mode with the required engine output set to be lowest, and is also provided to be stoppable in a second operation mode with the required engine output set higher than the required engine output of the first operation mode, and also in a third operation mode with the required engine output set higher than the required engine output of the second operation mode, and such that the engine is provided to enable, in the first operation mode, extraction of power by the operation of the piston caused by combustion of the fuel-air mixture, and to enable, in the second and third operation modes, extraction of the thrust force generated by combustion of the fuel-air mixture.

(8) Here, preferably, the engine is configured such that the operation control device controls operations of the main intake opening and closing member and of the sub-intake opening and closing member in such a manner that, in the first operation mode, at least one of the intake main port and the intake sub-ports is opened at the time of taking air into the combustion chamber, that, in the second operation mode, the opened and closed states of the intake sub-ports are intermittently switched at a rate corresponding to a required engine output, and that, in the third operation mode, at least the intake main port is always opened.

(9) In this case, the engine further includes an exhaust port configured to guide the combustion gas in the combustion chamber to the outside, and an exhaust opening and closing member configured to open and close the exhaust port, and can be configured such that, in the first operation mode, the operation control device opens the exhaust port only in the process of discharging the combustion gas from the combustion chamber, and such that, in the second and third operation modes, the operation control device controls operation of the exhaust opening and closing member so as to always open the exhaust port.

(10) Further, preferably, the engine is configured such that the ejection openings are formed at a projecting portion projecting toward the inner side from the wall surface of the combustion chamber, and the projecting portion is provided to have a wing shape capable of suppressing separation of the air stream in the combustion chamber.

(11) Further, preferably, the engine further includes a piston configured to be operated to enable the capacity in the combustion chamber to be changed.

(12) Further, preferably, the engine is configured such that the respective ejection openings are provided to be able to eject outside air symmetrically with respect to the central axis of the combustion chamber.

(13) Further, preferably, the engine is configured such that the respective ejection openings are provided at three or more places located axially symmetrically about the central axis of the combustion chamber.

(14) Here, preferably, the engine is configured such that the ejection openings are provided at six or more places.

(15) Further, preferably, the engine is configured such that the respective ejection openings are provided to be able to eject outside air three-dimensionally from the periphery of the fixed area so as to surround colliding streams formed in the fixed area.

(16) Further, preferably, the engine is configured such that the ejection openings are configured to be able to throttle the introduced outside air and to eject the throttled outside air.

(17) Further, the engine includes a piston configured to be operated to enable the capacity in the combustion chamber to be changed, and an operation control device configured to control operations of the piston and of members for changing the ejection state of outside air from the ejection openings, and can also be configured such that the outside air introduction part includes an intake main port configured to guide outside air into the combustion chamber from a direction along a central axis of the combustion chamber, and intake sub-ports configured to guide outside air into the combustion chamber toward the central axis from the periphery of the central axis, such that the ejection openings are provided to be able to eject the outside air from the intake sub-ports to the fixed area, and such that the operation control device is provided to be able to perform operation control in a space flight mode that simultaneously performs the compression by ram pressure generated by introducing at least outside air from the intake main port, and one or both of the compression by the operation of the piston, and the compression by the colliding streams intermittently generated in the fixed area by intermittently ejecting the outside air from the respective ejection openings.

(18) Further, preferably, the engine is configured such that the respective ejection openings are provided to make it possible that the streams of outside air ejected from the respective ejection openings are made to collide with each other in states of being slightly shifted from each other, to enable a spirally rotating stream to be formed in the fixed area.

(19) Further, the engine can also be configured such that, in the combustion chamber, a mixture of the outside air with hydrocarbon fuel or hydrogen is combusted in the state where platinum, nickel, palladium, or sulfur is used as a catalyst.

(20) Further, the engine can also be configured such that the respective ejection openings are provided to enable the streams of outside air to collide with each other at a plurality of places located along the central axis of the combustion chamber.

(21) Further, the engine can also be configured to further include an exhaust port configured to guide the combustion gas in the combustion chamber to the outside, and a flow passage configured to enable at least a part of the combustion gas discharged from the exhaust port to be returned to the inside of the combustion chamber.

(22) Further, the engine further includes an operation control device configured to control the ejection state of outside air from the ejection openings, and can also be configured such that the ejection openings are arranged at four or more places, and such that the operation control device controls the timing of ejecting the outside air from the respective ejection openings in such a manner that a plurality of ejection opening groups each consisting of a plurality of ejection openings are set and that the streams of outside air ejected from the ejection openings of each of the ejection opening groups are made to collide with each other with time differences between the respective ejection opening groups.

(23) Further, the present invention adopts an engine which includes a combustion chamber configured to enable combustion of a mixture obtained by mixing fuel with outside air, an outside air introduction part configured to introduce outside air into the combustion chamber, and an operation control device configured to operate predetermined members and to control the operation of the predetermined members, and which is configured such that the outside air introduction part includes an intake main port configured to guide outside air to a fixed area in the combustion chamber from a direction along the central axis of the combustion chamber, intake sub-ports configured to guide outside air into the combustion chamber from the direction toward the central axis, a main intake opening and closing member configured to open and close the intake main port, and a sub-intake opening and closing member configured to open and close the intake sub-ports, and such that the operation control device controls operations of the main intake opening and closing member and of the sub-intake opening and closing member so as to enable the opened and closed states of the intake main port and of the intake sub-ports to be switched according to a required engine output.

(24) Here, preferably the engine is configured such that the operation control device controls operations of the main intake opening and closing member and of the sub-intake opening and closing member to enable the opened and closed states of the intake sub-ports to be intermittently switched at a rate according to a required engine output.

(25) In this case, the engine includes a piston configured to be operated to enable the capacity of the combustion chamber to be changed, and can be configured such that the piston is provided to be movable in a first operation mode with the required engine output set to be lowest, and also is provided to be stoppable in a second operation mode with the required engine output set higher than the required engine output of the first operation mode, and in a third operation mode with the required engine output set higher than the required engine output of the second operation mode, and such that the engine is provided to enable, in the first operation mode, extraction of power by the operation of the piston caused by combustion of the fuel-air mixture, and to enable, in the second and third operation modes, extraction of the thrust force generated by combustion of the fuel-air mixture.

Advantageous Effects of Invention

In the above-described configuration (1), the structure is adopted in which the streams of outside air ejected from the plurality of ejection openings to the fixed area in the combustion chamber are made to collide with each other, to thereby compress the mixture obtained by mixing fuel with outside air introduced into the combustion chamber. Therefore, the configuration does not need various devices for air compression, such as a compressor, and a turbine, which are used for conventional jet engines, and hence the configuration can contribute to reduce the size and weight of the engine as a whole. Therefore, it is possible to form an engine which can also be easily incorporated in a structure necessary to cover the other speed ranges, and which can cover a wide speed range without increasing the size of the engine as a whole. Further, as compared with a conventional jet engine and a scram engine, the thermal efficiency of the engine can be improved by increasing the compression ratio of the fuel-air mixture in the combustion chamber. Therefore, as compared with the conventional engines, a higher engine output can be obtained with a smaller amount of fuel.

In the above-described configuration (2), the outside air is ejected from the ejection openings toward the fixed area in a pulse manner. Thereby, the pressure in the combustion chamber can be increased and decreased according to the generation of colliding streams, so that the combustion efficiency can be further increased. That is, when the ejection of outside air is stopped in the state where the outside air is ejected into the combustion chamber, the pressure in the combustion chamber is temporarily reduced. Then, when outside air is again ejected into the combustion chamber in this state, the outside air is more easily taken into the combustion chamber. Therefore, the compression ratio of the fuel-air mixture in the combustion chamber can be further increased by repeating these operations.

In the above-described configurations (3) and (5), the intake main port and the intake sub-ports, which are different kinds of intake ports, can be selectively used in correspondence with a required engine output, and thereby the compression of the fuel-air mixture in the combustion chamber can be efficiently performed.

In the above-described configuration (4), the compression effect by the collision of the streams of outside air ejected from the respective ejection openings can be further increased, and hence the compression ratio of the fuel-air mixture in the combustion chamber can be further increased.

In the above-described configurations (6) and (8), the pressure in the combustion chamber can be increased and decreased by repeating the opening and closing of the intake sub-ports. That is, when the intake sub-ports are closed, the inflow of outside air into the combustion chamber is stopped, and thereby the pressure in the combustion chamber is temporarily reduced. Then, when the intake sub-ports are opened, outside air can be more easily taken into the combustion chamber. Thereby, the compression ratio of the fuel-air mixture in the combustion chamber can be further increased, so that more efficient combustion can be performed.

In the above-described configuration (10), the air stream in the direction along the central axis of the combustion chamber can be effectively used.

In the above-described configurations (12) and (13), the streams of outside air ejected from the respective plurality of ejection openings into the combustion chamber are made to axially symmetrically collide with each other so as to be compressed. As a result, the internal flow of the fuel-air mixture is stabilized in the combustion chamber to facilitate the stabilization of combustion, and thereby the reduction in the fuel cost of the engine can be promoted. Further, since the stream of outside air is ejected from each of the plurality of ejection openings toward the central axis of the combustion chamber, the fuel and the combustion gas are prevented from excessively reaching near the wall surface of the combustion chamber. Thereby, the cooling of the fuel and the combustion gas due to contact with the wall surface is suppressed, and the energy loss due to the cooling is suppressed. As a result, the engine thermal efficiency can be further improved.

In the above-described configurations (13), (14) and (15), the combustion can be further stabilized. Further, in the above-described configuration (14), the compression ratio of the gas in the combustion chamber can be significantly increased.

In the above-described configuration (18), the combustion can be stabilized against disturbance.

In the above-described configuration (19), cold nuclear fusion is generated in the absence of oxygen, so that a thrust force can be obtained. Therefore, when the configuration is applied as an engine for making space flight in which it is difficult to obtain oxygen from the outside, the other devices for supplying oxygen, and the like, need not be additionally used. Thereby, the configuration of the engine can be simplified and also the size of the engine can be reduced.

In the above-described configuration (20), the compression ratio of the gas in the combustion chamber can be further increased.

In the above-described configuration (21), the combustion efficiency of toxic substance in the combustion gas can be increased, and the exhaust characteristics can be improved. Also, the compression ratio of the gas in the combustion chamber can be further increased.

In the above-described configuration (22), the fuel-air mixture in the combustion chamber is combusted by the compression generated by the colliding streams of supersonic air streams ejected from an ejection opening group, and further in the process of expansion of the gas in the combustion chamber, the gas in the combustion chamber can be compressed by the colliding streams of supersonic air streams ejected from the other ejection opening group. Thereby, the noise generated at the time of expansion of the gas in the combustion chamber can be confined by the colliding streams of supersonic air streams subsequently ejected from the other ejection opening group.

Further, in each of the configurations of the present invention, an engine capable of covering a wide speed range can be formed without an increase in the size of the apparatus as a whole.

BRIEF DESCRIPTION OF DRAWINGS

FIG. 4(A) is a schematic sectional view of the engine body taken along the line A-A in FIG. 2, and FIG. 4(B) is a conceptual perspective view of a partition member.

FIG. 9(A) is a schematic sectional view of the engine body taken along the line E-E line in FIG. 2, FIG. 9(B) is a schematic sectional view of the engine body taken along the line F-F in FIG. 2, and FIG. 9(C) is a schematic sectional view of the engine body taken along the line G-G in FIG. 2.

FIG. 10(A) is a schematic side view of the engine body, and FIG. 10(B) is a schematic plan view of the engine body.

DESCRIPTION OF EMBODIMENTS

In the following, an embodiment according to the present invention will be described with reference to the accompanying drawings.

Figure 1:
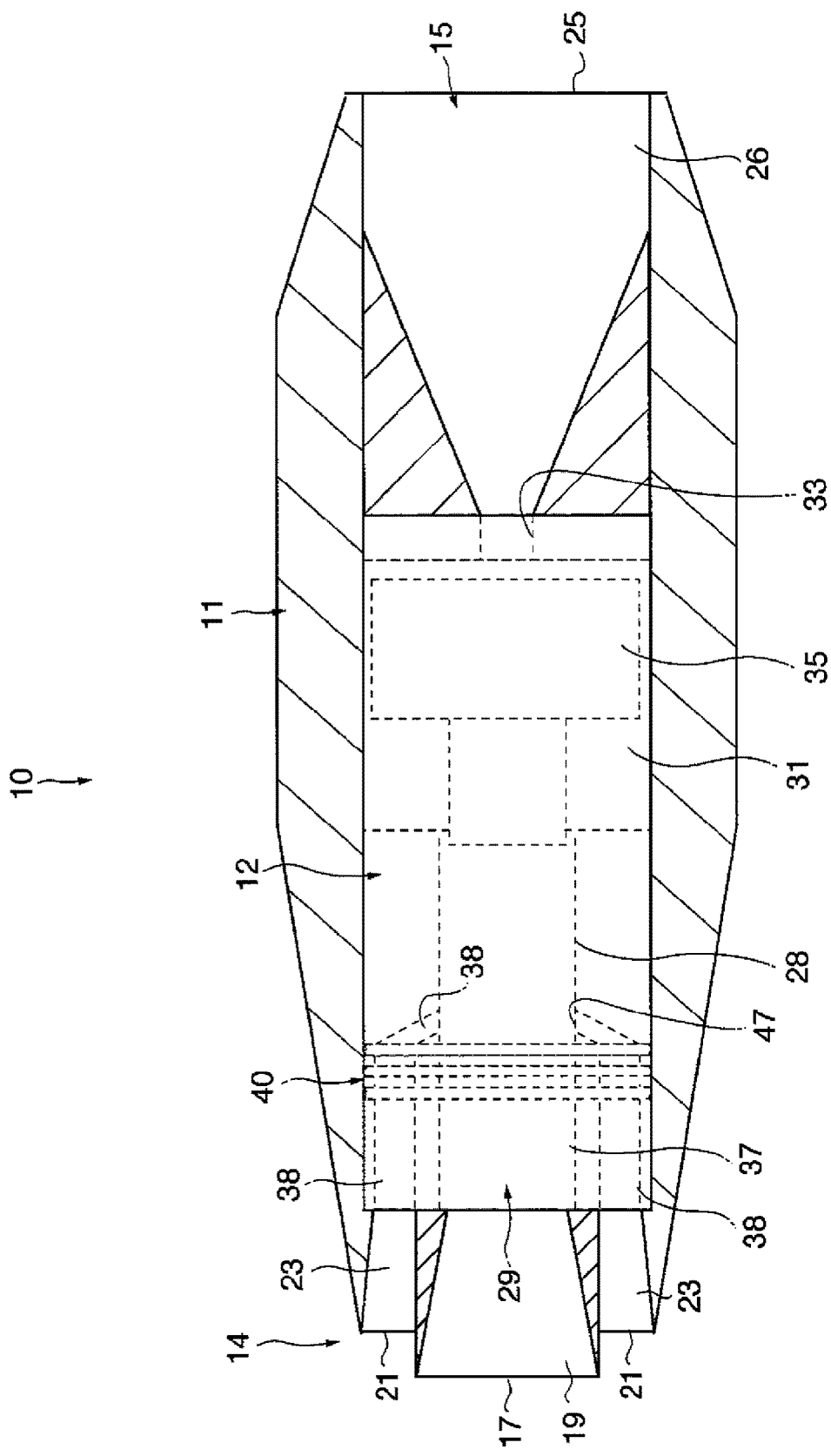
FIG. 1 is a schematic sectional view of an engine according to a present embodiment.

FIG. 1 is a schematic sectional view of an engine according to a present embodiment. In FIG. 1, an engine 10 is configured to be mounted to a movable body (not shown) which can travel like an automobile on the ground and can also fly like an airplane in the air. The engine 10 is configured by including an outer casing 11 which is represented in cross section in FIG. 1 and which is attached to a part of the movable body, and an engine body 12 which is housed in the casing 11.

The casing 11 is provided so as to surround the engine body 12. An outside air intake part 14 for taking outside air into the engine body 12 is formed on the front end side of the casing (which side is the left end side in FIG. 1), and an exhaust part 15 for exhausting the combustion gas from the engine body 12 to the outside is formed on the back end side of the casing (which side is the right end side in FIG. 1).

Note that, in the following description, the side of the outside air intake part 14 of the engine 10 is referred to as "front", and the side of the exhaust part 15 of the engine 10 is referred to as "back" unless otherwise specified.

The outside air intake part 14 has a double cylinder structure having an opening on the front end side, and a flow passage of the outside air is formed in each of the inner cylinder and the outer cylinder. Specifically, the outside air intake part 14 includes a central intake port 17 opened at the central position of the outside air intake part 14, a central flow passage 19 for guiding outside air from the central intake port 17 to the engine body 12, an outer intake port 21 opened around the central intake port 17, and an outer flow passage 23 for guiding outside air from the outer intake port 21 to the engine body 12. Each of the central flow passage 19 and the outer flow passage 23 is formed in a throttle flow passage in which the sectional area of the flow passage is gradually reduced from the front end side toward the side of the engine body 12. Note that each of the central flow passage 19 and the outer flow passage 23 may also be formed in a Laval nozzle shape in which the sectional area of the flow passage is gradually reduced from the front end side to the middle and is gradually increased from the middle to the back end side of the flow passage.

The exhaust part 15 includes an exhaust port 25 opened at the back end side of the engine 10, and an exhaust flow passage 26 for guiding the combustion gas from the side of the engine body 12 to the exhaust port 25. The exhaust flow passage 26 is formed in a shape in which the sectional area of the flow passage is gradually increased from the engine body 12 toward the exhaust port 25.

Figure 2:
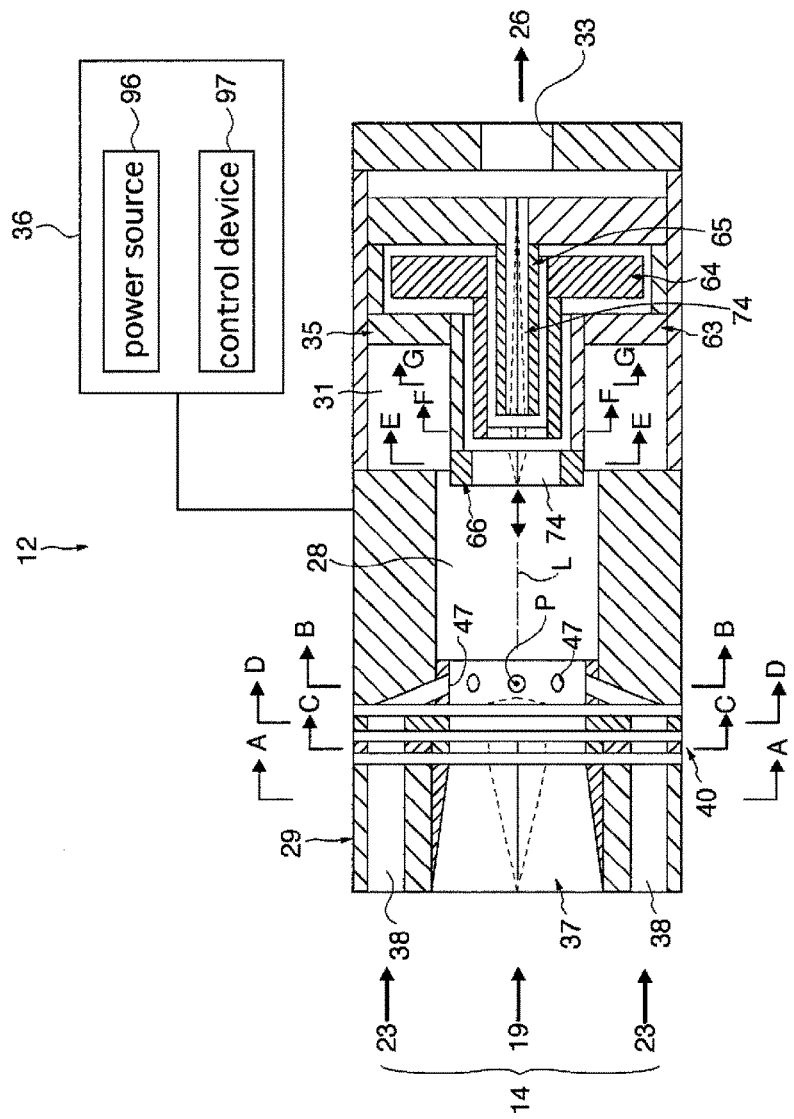
FIG. 2 is a schematic sectional view of an engine body.

The engine body 12 has an almost cylindrical external shape, and is configured, as shown in FIG. 2, by including a combustion chamber 28 formed near the center of the engine body 12 in the front-back direction and having a substantially circular cross section, an outside air introduction part 29 located on the front side (left side in FIG. 2) and configured to guide outside air from the outside air intake part 14 of the casing 11 to the combustion chamber 28, a back side space 31 connected to the back side of the combustion chamber 28, an exhaust hole 33 connected to the back end side of the back side space 31 and communicating with the exhaust flow passage 26 of the casing 11, a piston 35 housed in the back side space 31 and configured to be movable in the front and back direction so as to increase and decrease the capacity in the combustion chamber 28, and an operation control device 36 configured to operate predetermined portions of the engine body 12 and to control the operation of the predetermined portions.

Figure 3:
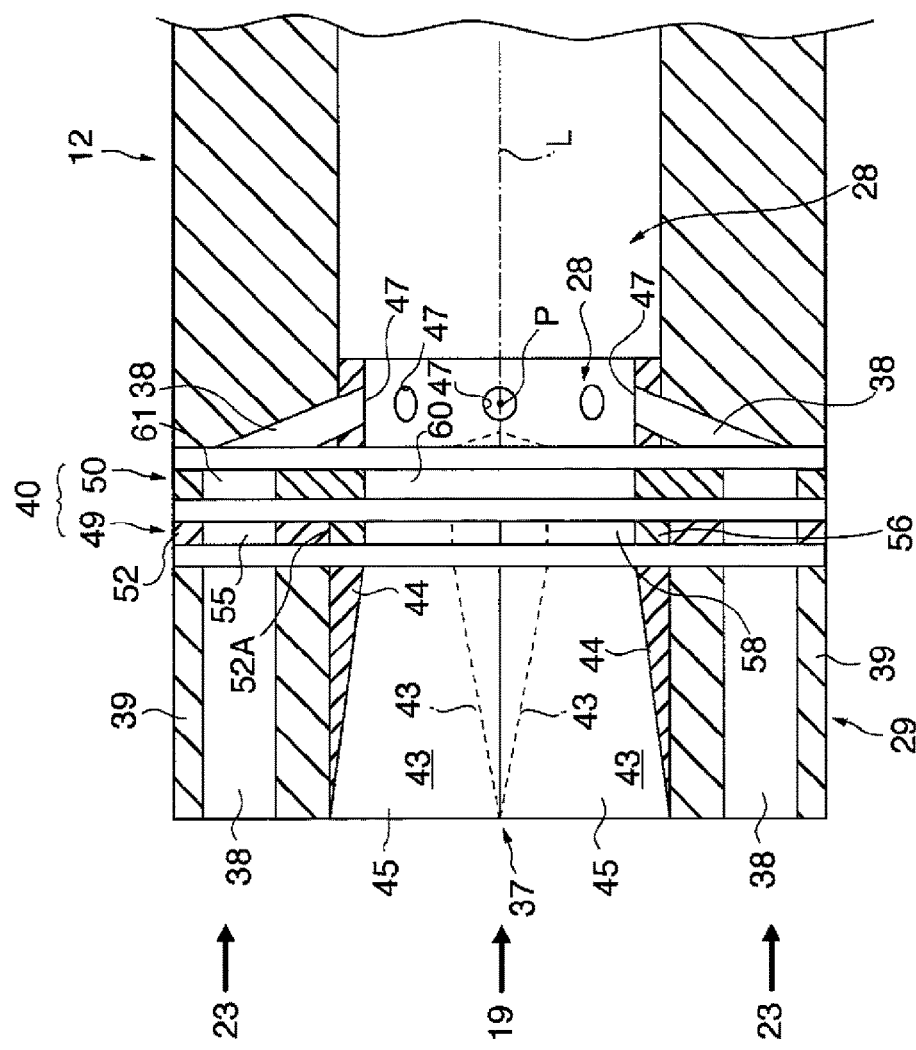
FIG. 3 is an enlarged sectional view of the intake side portion of the engine body.

As shown in FIG. 3, the outside air introduction part 29 is configured by including an intake main port 37 connected to the central flow passage 19 of the casing 11 and configured to guide outside air to the inside of the combustion chamber 28, intake sub-ports 38 provided at a plurality of places outside the intake main ports 37 and connected to the outer flow passage 23 of the casing 11 so as to guide outside air to the inside of the combustion chamber 28, and outside air introduction control means 40 for controlling introduction of outside air from each of the intake main port 37 and the intake sub-ports 38 to the combustion chamber 28.

The intake main port 37 is formed so as to guide outside air into the combustion chamber 28 from the direction along the central axis L of the combustion chamber 28, and is, as shown in FIG. 4(A), provided in a hollow portion of a formed body 39 having a substantially cylindrical shape. In the intake main port 37, partition members 43 arranged at a plurality of places (eight places in the present embodiment) at regular intervals in the circumferential direction, and a wing member 44 arranged between each pair of the partition members 43 adjacent to each other are provided. The space surrounded by the partition member 43 and the wing member 44 serves as central introduction passages 45 for guiding outside air from the central flow passage 19 of the casing 11 to the combustion chamber 28.

The partition member 43 is arranged from the inner peripheral wall 41 of the hollow portion toward the center of the hollow portion, and is arranged alternately in each of a plurality of spaces (16 spaces in the present embodiment) formed by dividing the hollow portion equally in the circumferential direction. The partition member 43 is formed to have a wedge-shaped cross section whose cross-sectional area is gradually increased from the front end side toward the back end side (see FIG. 4(B)), and is formed so that the cross-sectional shape of the rear end portion corresponds to the cross-sectional shape of one of the plurality of equally divided spaces.

In each space of the plurality of equally divided spaces, in which space the partition member 43 is not provided, the wing member 44 is arranged so as to slightly project from the inner peripheral wall 41 of the hollow portion, and has a surface shape configured to prevent separation from being caused in the flow of outside air passing through the central introduction passages 45 toward the combustion chamber 28.

As shown in FIG. 3, each of the intake sub-ports 38 is arranged outside the intake main port 37, and is connected to an ejection opening 47 opened in the combustion chamber 28, so as to be configured as a flow passage through which outside air introduced from the outer flow passage 23 of the casing 11 can be ejected from the ejection opening 47 into the combustion chamber 28. As shown in FIG. 4(A), the intake sub-port 38 is formed to have a circular cross section, and is provided at each of a plurality of places (eight places in the present embodiment) provided at equal intervals along the circumferential direction outside the central introduction passages 45 of the intake main port 37. Further, each of the intake sub-ports 38 has the same passage configuration including the opening area.

Figure 5:
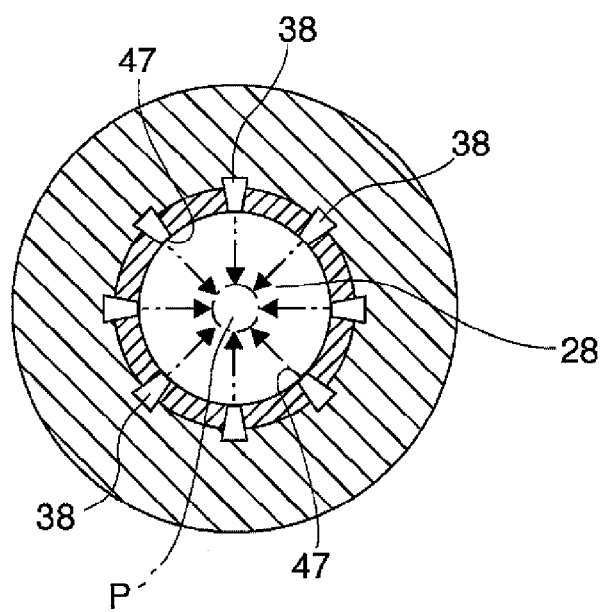
FIG. 5 is a schematic sectional view of the engine body taken along the line B-B in FIG. 2.

As shown in FIG. 3, the ejection opening 47 is provided at a projecting portion slightly projected to the inner side from the wall surface of the combustion chamber 28. Further, as shown in FIG. 5, the ejection openings 47 have the same shape and are configured to eject outside air toward the central axis L (see FIG. 3) in the combustion chamber 28 from the positions located at substantially regular intervals in the circumferential direction in the combustion chamber 28, so as to compress the outside air in such a manner that the streams of outside air ejected from the respective ejection openings 47 are made to collide with each other at a collision point P set in a fixed area located at the center in the combustion chamber 28. Here, it is preferred that the projecting portion, in which the ejection opening 47 is formed, is formed in a wing shape capable of suppressing separation of the air flow in the combustion chamber 28.

Note that the intake sub-port 38 can also be formed as a throttle flow passage which is formed to have a cross section of an elliptical shape, or the like, in order to largely increase the inlet area, and in which the passage sectional area is gradually reduced from the inlet side toward the outlet side (the side of the ejection opening 47). In the case where the intake sub-ports 38 are formed in this way, it is possible to further increase the compression effect at the time when the streams of outside air ejected from the respective ejection openings 47 are made to collide with each other at the collision point P. Further, the intake sub-port 38 can be formed in a shape of Laval nozzle in which the passage sectional area is gradually reduced from the front end side to the middle and is gradually increased from the middle to the back end side. In short, as long as the respective intake sub-ports 38 can eject the outside air symmetrically toward the central axis L of the combustion chamber 28, various shapes and configurations can be adopted for the intake sub-port 38. Further, the plurality of intake sub-ports 38 do not necessarily need to have the same opening area and the same flow passage shape.

The outside air introduction control means 40 includes a disc-like main intake opening and closing member 49 configured to open and close the intake main port 37, and a disc-like sub-intake opening and closing member 50 arranged on the backside of the main intake opening and closing member 49 and configured to open and close the intake sub-ports 38.

Figure 6:
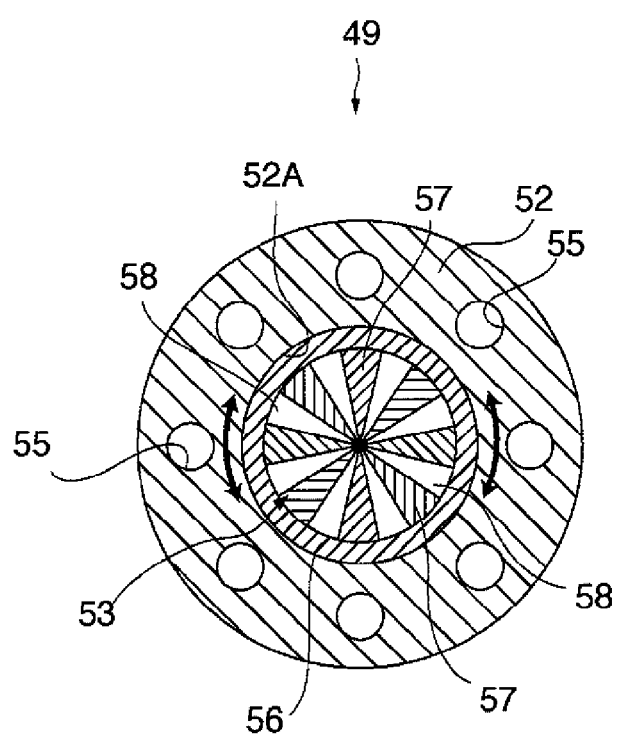
FIG. 6 is a schematic sectional view of the engine body taken along the line C-C in FIG. 2.

As shown in FIG. 6, the main intake opening and closing member 49 includes a doughnut-shaped body plate 52, and a shutter 53 rotatably inserted into a center hole 52A formed at the center of the body plate 52.

The body plate 52 is immovably fixed to the engine body 12, and through holes 55, each of which is connected without a gap to each of the intake sub-ports 38, are formed at a plurality of places (eight places in the present embodiment) located at equal intervals in the circumferential direction of the body plate 52.

The shutter 53 is configured by a hollow ring-shaped member 56 arranged to be in contact with the center hole 52A of the body plates 52, and closing members 57 arranged dispersedly inside the ring-shaped member 56. The closing member 57 has a cross-sectional shape corresponding to the back end portion of the partition member 43 of the intake main port 37 (see FIG. 4(B)). Therefore, the inner side of the ring-shaped member 56 is formed in a cross-sectional shape corresponding to the cross-sectional shape of the inner shape of the intake main port 37 not provided therein with the wing members 44, and has a shape in which the closing members 57 and gaps 58 permitting the outside air to pass therethrough are alternately arranged. When the shutter 53 is rotated in the center hole 52A of the body plate 52, all the central introduction passages 45 of the intake main port 37 can be opened and closed at the same time.

Therefore, by the rotational operation of the ring-shaped member 56 provided in the main intake opening and closing member 49, the position of the main intake opening and closing member 49 can be switched between the opened position permitting outside air to be taken into the combustion chamber 28 from the intake main port 37, and the closed position blocking the intake of outside air from the intake main port 37 into the combustion chamber 28. Note that the operation for the switching, and the control of the operation are performed by the operation control device 36 as will be described below.

Figure 7:
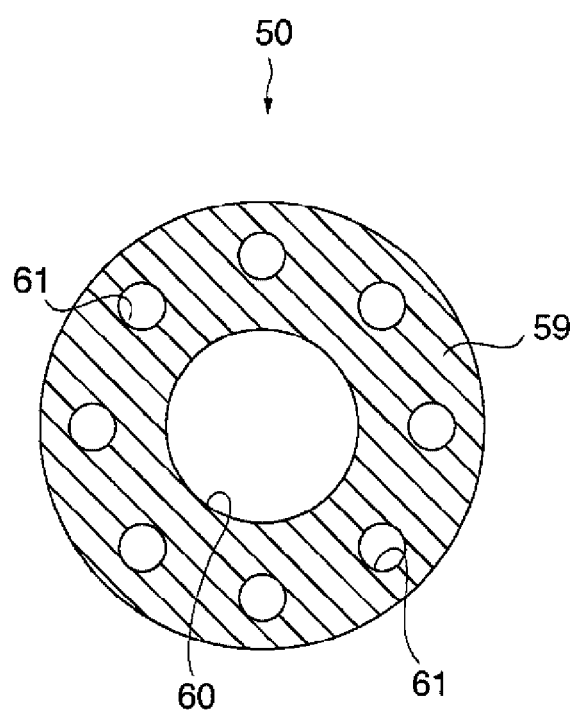
FIG. 7 is a schematic sectional view of the engine body taken along the line D-D in FIG. 2.

As shown in FIG. 7, the sub-intake opening and closing member 50 is configured by a doughnut-shaped body plate 59, a center hole 60 formed to penetrate through the central portion of the body plate 59, and outer holes 61 formed at a plurality of places (eight places in the present embodiment) located at equal intervals in the circumferential direction of the body plate 59, and is rotatably supported by the engine body 12 so as to be centered at the center of the center hole 60.

The center hole 60 is formed to have an inner diameter substantially equal to or slightly larger than the inner diameter of the ring-shaped member 56 (see FIG. 6) of the main intake opening and closing member 49, and is arranged at the back side portion with respect to the ring-shaped member 56.

Each of the outer holes 61 is formed to have an inner diameter substantially equal to the inner diameter of the through hole 55 of the main intake opening and closing member 49, and is arranged so that, according to the rotational state of the sub-intake opening and closing member 50, each of the outer holes 61 can be displaced between the position permitting the outer hole 61 to be connected without a gap to the through hole 55 communicating with the intake sub-port 38, and the position not permitting the outer hole 61 to be connected to the through hole 55.

Therefore, the sub-intake opening and closing member 50 is configured such that, by its rotational operation, its position can be switched between the opened position permitting the intake of outside air from the intake sub-ports 38 into the combustion chamber 28, and the closed position blocking the intake of outside air from the intake sub-ports 38 into the combustion chamber 28. Note that the operation for the switching, and the control of the operation are performed by the operation control device 36 as will be described below.

Note that, although not shown, a fuel injection part is provided in the combustion chamber 28. The present invention is not limited to this, and a fuel injection structure can be adopted in various portions as long as a mixture of fuel and outside air can be formed in the combustion chamber 28. Specifically, in place of or in addition to the structure in which the fuel is injected into the combustion chamber 28, it is also possible to use a structure in which the fuel is injected into the intake main port 37 and/or the intake sub-ports 38.

Figure 8:
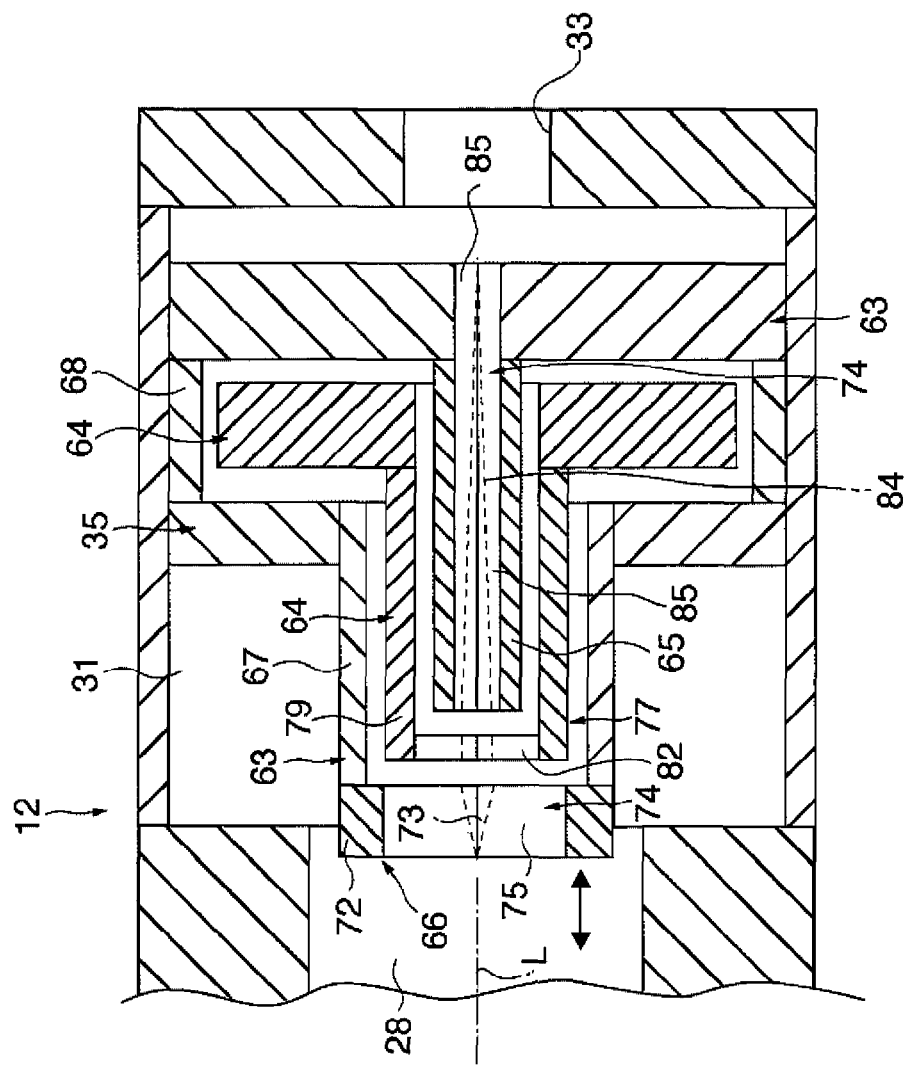
FIG. 8 is an enlarged sectional view of an exhaust side portion of the engine body.

As shown in FIG. 8, the piston 35 includes a hollow outer member 63 supported in the back side space 31 so as to be slidable in the front and back direction, a hollow intermediate member 64 housed in the inner space of the outer member 63 and arranged rotatably with respect to the outer member 63 about the central axis L of the combustion chamber 28, and a hollow inner member 65 arranged to extend in the inner space of the intermediate member 64 from the back end side (the right end side in FIG. 8) of the outer member 63 toward the front side of the outer member 63.

The outer member 63 is formed to have a substantially convex external shape, and is configured by including a disc-like front end portion 66 located at a frontmost position, a small-diameter cylindrical portion 67 having an outer diameter substantially equal to the outer diameter of the front end portion 66 and connected to the back side of the front end portion 66, a large-diameter cylindrical portion 68 having an outer diameter substantially equal to the inner diameter of the back side space 31 and connected to the back side of the small-diameter cylindrical portion 67.

As shown in FIG. 9(A), the front end portion 66 is configured by a ring-shaped member 72 having an outer diameter substantially equal to or slightly smaller than the inner diameter of the combustion chamber 28, and partition members 73 located inside the ring-shaped member 72.

Each of the partition members 73, which has the same shape and the same arrangement state as those of each of the partition members 43 provided in the intake main port 37, is formed in a wedge shape corresponding to the shape of one space obtained by equally dividing the inner space of the ring-shaped member 72 into a plurality of spaces (16 spaces in the present embodiment) in the circumferential direction, and is alternately arranged in each of the plurality of equally divided spaces. Among the plurality of equally divided spaces, the space not provided with the partition member 73 serves as an exhaust space 75 configuring a part of exhaust port 74 for discharging the combustion gas generated in the combustion chamber 28 from the exhaust hole 33.

As shown in FIG. 8, the intermediate member 64 is formed to have a substantially convex outer shape, and a shutter 77 configured similarly to the shutter 53 of the main intake opening and closing member 49 is provided at the front end side of the intermediate member 64. That is, the shutter 77 is configured by a cylindrical member 79 opened at both sides thereof, and closing members 80 (see FIG. 9(B)) arranged at the front end side portion (left end side in FIG. 8) of the cylindrical member 79 and provided from the inner wall toward the center of the cylindrical member 79. The closing member 80 has a cross-sectional shape corresponding to the cross-sectional shape of the partition member 73 of the front end portion 66. That is, the closing member 80 and a gap 82 through which the combustion gas passes are arranged alternately in the inside of the front end side of the cylindrical member 79.

The inner member 65 is formed in a cylindrical shape, both end sides of which are opened. As shown in FIG. 9(C), wedge-shaped partition members 84, each having a cross-sectional shape corresponding to the cross-sectional shape of the partition member 73 of the outer member 63, are formed in the inner space of the inner member 65. Further, the space, in which the partition member 84 is not provided, serves as an exhaust space 85 configuring a part of the exhaust port 74. The partition members 84 are arranged in the same manner as the partition members 73, so as to be fixed at positions respectively corresponding to the partition members 73. Further, the exhaust space 85 is arranged such that the opened portion of the front end side of the exhaust space 85 faces the exhaust space 75 of the outer member 63 via the shutter 77 of the intermediate member 64, and such that the opened portion of the back end side of the exhaust space 85 penetrates the back end portion of the outer member 63 so as to face the exhaust hole 33.

Therefore, the structure of the shutter 77 makes it possible that, when the intermediate member 64 is rotated with respect to the outer member 63, the position of the shutter 77 is switched between the opened position at which the exhaust spaces 75 and 85 are made to communicate with each other via the gaps 82, and the closed position at which the communication between the exhaust spaces 75 and 85 is blocked by the closing member 80. Therefore, at the opened position, the combustion gas from the combustion chamber 28 can be discharged from the exhaust hole 33 to the outside of the engine body 12 through the exhaust port 74 configured by the respective exhaust spaces 75 and 85. On the other hand, in the closed position, the exhaust port 74 is blocked in the middle, so that the combustion gas from the combustion chamber 28 is prevented from being discharged to the outside. For this reason, the intermediate member 64 configures an exhaust opening and closing member for opening and closing the exhaust port 74. Note that the switching operation by the intermediate member 64 and the control of the switching operation are performed by the operation control device 36 as will be described below.

Note that, in order to avoid complication of the drawings, in FIG. 2, FIG. 8, FIG. 9, and the like, the gaps are respectively drawn between the inner wall of the combustion chamber 28 and the ring-shaped portion 72, between the outer member 63 and the intermediate member 64, and between the intermediate member 64 and the inner member 65. In practice, there is almost no gap in these portions, and it is configured such that, when the shutter 77 is set at the opened position, all of the combustion gas from the combustion chamber 28 is made to flow into the exhaust port 74.

Further, as will be described below, the piston 35 is provided so as to be reciprocated in the front-back direction in the back side space 31. However, as shown in FIG. 10, a crank mechanism 89 for converting the reciprocating movement of the piston 35 to a rotational movement is connected to the piston 35. A pair of the crank mechanisms 89 are arranged at both right and left sides (both upper and lower sides in FIG. 10(B)) outside the engine body 12, and are configured such that, when the piston 35 is reciprocated in the front-back direction (in the right and left direction in FIG. 10), the axle C connected to wheels (not shown) of the movable body, to which the engine 10 is mounted, is rotated. Specifically, the crank mechanism 89 includes a disk member 91 provided so as to be rotatable about its central portion fixed to the axle C, an arm 92 having one end side fixed to the non-center portion of the disk member 91, a slot hole 93 formed in the engine body 12 so as to extend in the front-back direction, and a connecting shaft 94 rotatably attached to the other end side of the arm 92 and fixed to a part of the outer member 63 of the piston 35 through the slot hole 93. Note that the disk member 91 is arranged in the offset state in which the axle C is shifted from the extension line in the extending direction of the slot hole 93.

Note that the crank mechanism 89 is not limited to the above-described configuration, and various structures may be adopted as the crank mechanism 89, as long as the structures can convert the reciprocating movement of the piston 35 into a rotational movement.

As shown in FIG. 2, the operation control device 36 includes a power source 96 configured to operate the various members, and a control device 97 configured to control the power source.

The power source 96 is configured to operate, at predetermined timings, the main intake opening and closing member 49, the sub-intake opening and closing member 50, and the intermediate member 64 serving as an exhaust opening and closing member, and is configured to operate the piston 35 at the time of starting the engine 10. As the power source 96, various structures can be adopted as long as each of the structures can operate the respective members as will be described below. For example, in addition to a structure in which the operation of each of the members is performed on the basis of electromagnetic induction using a coil, and the like, a structure using an actuator, such as a motor, may also be adopted.

The control device 97 performs drive control of the power source 96 so as to operate the main intake opening and closing member 49, the sub-intake opening and closing member 50, the intermediate member 64, and the piston 35 at timings as will be described below.

Figure 11:
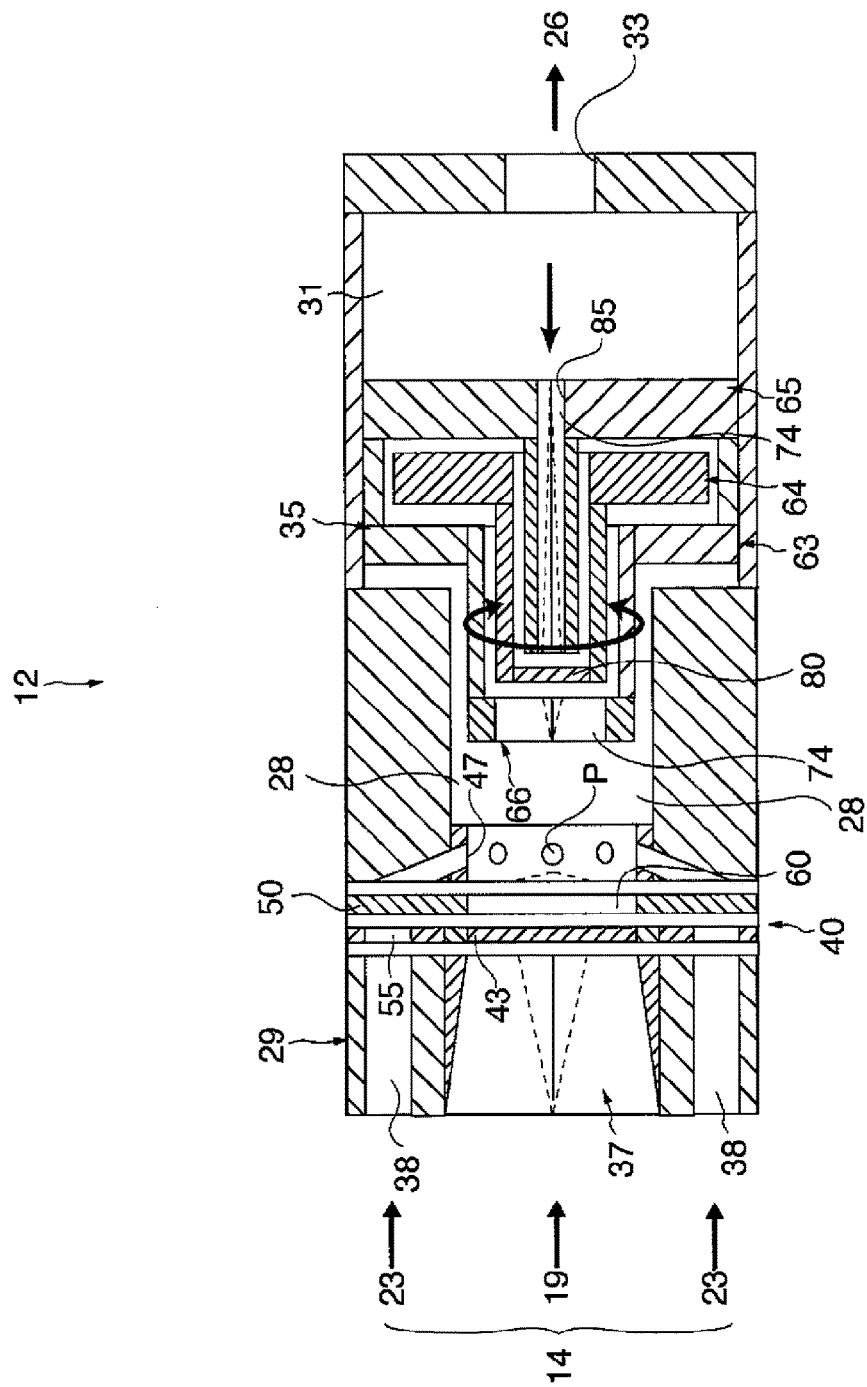
FIG. 11 is a schematic sectional view of the engine body in the state where the piston is moved from the state of FIG. 2.

Next, operations of the engine 10 will be described with reference to FIG. 2, FIG. 3, FIG. 11, and the like.

The engine body 11 is operated in different first, second and third operation modes according to outputs of the engine. That is, the first operation mode is applied to a case where the vehicle body is made to travel at a speed in a first low-speed range (for example, a range of speed less than about Mach 0.5), like a case where the movable body is made to travel on the ground like an automobile.

In the case of the first operation mode, when a start switch (not shown) is turned on, the intake main port 37 is closed by the operation of the main intake opening and closing member 49, so as to prevent the intake of air from the intake main port 37 into the combustion chamber 28, while the intake sub-ports 38 are opened by the operation of the sub-intake opening and closing member 50, so as to permit only the intake of air from the intake sub-ports 38 into the combustion chamber 28. Further, the outflow of the gas from the combustion chamber 28 to the exhaust port 74 is prevented by the operation of the intermediate member 64. Therefore, at this time, an intake stroke is performed in which the outside air is introduced into the combustion chamber 28 only from the intake sub-ports 38. Then, the outside air introduced into the combustion chamber 28 is mixed with fuel injected from an injection part (not shown), so as to form a fuel-air mixture.

Next, in the state where the inflow of outside air from the intake main port 37 into the combustion chamber 28, and the outflow of the gas from the combustion chamber 28 to the exhaust port 74 are prevented, the intake sub-ports 38 are further closed by the operation of the sub-intake opening and closing member 50, so that all of the inflow and outflow of the gas into and from the combustion chamber 28 are prevented. In this state, the piston 35 starts to be moved forward (to the left in FIG. 2), so as to be moved from the position shown in FIG. 2 to the position shown in FIG. 11. As a result, a compression stroke for compressing the fuel-air mixture in the combustion chamber 28 is performed.

Then, a combustion stroke for combusting the fuel-air mixture in the combustion chamber 28 is performed by using ignition means (not shown), and the piston 35 is moved backward (to the right side in FIG. 11) by the explosive force of combustion, so as to be returned to the position shown in FIG. 2. Here, other than spark ignition means using a plug, or the like, any means may be used as the ignition means as exemplified by laser ignition means, and the like, as long as the means can be used for combusting and exploding the fuel. Further, a self-ignition method may also be adopted which does not use the above-described ignition means and in which, at the time of compression, the fuel is combusted and exploded due to the characteristics of the fuel.

Next, in the state where the intake of air from both the intake main port 37 and the intake sub-port 38 into the combustion chamber 28 is prevented, an exhaust stroke for discharging the combustion gas generated in the combustion chamber 28 to the outside of the engine 10 is performed by permitting the outflow of the gas from the combustion chamber 28 to the exhaust port 74 by the operation of the intermediate member 64.

Thereafter, the piston 35 is made to reciprocate in the front and back direction while performing in order each of the above-described strokes by the inertia thereof without depending on the power source 96. Then, according to the reciprocating movement of the piston 35, the axle C is rotated by the crank mechanism 89 (see FIG. 10) connected to the piston 35, so as to enable the movable body (not shown) to travel on the ground. Note that the speed of the movable body in this case is controlled by the amount of fuel injected into the combustion chamber 28, and the like. Here, the operations of the main intake opening and closing member 49, the sub-intake opening and closing member 50, and the intermediate member 64 in each of the strokes are performed according to the rotational angle of the disk member 91 of the crank mechanism 89, and the rotational angle of the disk member 91 is detected by a sensor (not shown) additionally attached to the disk member 91.

Note that, in such a case where the movable body takes off from the ground into the air, when the speed of the movable body reaches near the maximum speed in the first speed range, it is also possible, in the intake stroke, to permit the intake of air into the combustion chamber 28 from both the intake main port 37 and the intake sub-ports 38 not only by opening the intake sub-ports 38 but also by opening the intake main port 37 by the operation of the main intake opening and closing member 49.

Further, in the case of the first operation mode, the engine body 11 may also be operated such that, in the intake stroke, the intake main port 37 is opened and the intake sub-ports 38 are closed, and such that the intake main port 37 is closed in the next stroke.

The second operation mode is applied to a case where the movable body is made to fly in the air at a speed in a second speed range (for example, a range of speed from about Mach 0.5 to about Mach 2), like a case where the movable body is made to fly in the air like an airplane.

In the case of the second operation mode, the piston 35 is locked immovably at the position which is shown in FIG. 2, and at which the capacity inside the combustion chamber 28 is maximum. In this state, the intake main port 37 is always opened by the main intake opening and closing member 49, so that the intake of air from the intake main port 37 into the combustion chamber 28 is always performed. Further, the exhaust port 74 is always opened by the intermediate member 64, so as to permit the combustion gas to be always discharged from the combustion chamber 28. At this time, the intake sub-ports 38 are repeatedly opened and closed by the operation of the sub-intake opening and closing member 50 according to the speed of the movable body, so that outside air is intermittently supplied from the intake sub-ports 38 to the combustion chamber 28. Here, the outside air introduced into the combustion chamber 28 from the intake sub-port 38 is ejected from the plurality of places located in the circumferential direction in the combustion chamber 28 toward the collision point P set in the fixed area. At the collision point P, the streams of outside air from the respective intake sub-ports 38 are made to collide with each other, and also made to collide with outside air taken from the intake main port 37. Thereby, the fuel-air mixture is compressed in the combustion chamber 28, so that the pressure, temperature, and density of the fuel-air mixture are increased. Then, the fuel-air mixture in the combustion chamber 28 is combusted and exploded, and the combustion gas is discharged to the outside of the engine 10 through the exhaust port 74, so that a thrust force of the movable body is obtained.

Here, by intermittently supplying the outside air from the intake sub-ports 38 into the combustion chamber 28, the ejection timing of the outside air is controlled so that colliding streams are intermittently generated in the collision point P. As a result, the efficiency of taking outside air into the combustion chamber 28 can be increased, and the compression effect of the fuel-air mixture in the combustion chamber 28 is increased. That is, when the intake sub-ports 38 are changed from the opened state to the closed state, so that the air intake into the combustion chamber 28 is changed from the permitted state to the prevented state, the pressure in the combustion chamber 28 is reduced. When the intake sub-ports 38 are changed from the closed state to the opened state, the outside air is more easily taken into the combustion chamber 28 in which the pressure is momentarily reduced. Thereby, the compression effect of the outside air introduced into the combustion chamber 28 is increased. Note that the operation of the sub-intake opening and closing member 50 is controlled by the control device 97 so that the rate of switching between the opened and closed states of the intake sub-ports 38 is increased as the speed of the movable body is increased. Further, the engine body 11 can also be configured such that, in the case where the operation mode is shifted from the second operation mode to the third operation mode, the sub-intake opening and closing member 50 can be smoothly stopped in such a manner that, in the process in which the speed of the movable body is increased in the second operation mode, when the speed of the movable body reaches a predetermined speed, the number of revolutions of the sub-intake opening and closing member 50 is reduced and thereby the rate of switching between the opened and closed states of the intake sub-ports 38 is reduced.

Note that, in the second operation mode, the intake main port 37 may be always closed.

The third operation mode is applied to a case where the movable body is made to fly at a speed in a third speed range (for example, a range of speed more than about Mach 2).

Also in the third operation mode, the piston 35 is locked immovably at the position shown in FIG. 2. Here, all of the intake main port 37, the intake sub-ports 38, and the exhaust port 74 are always opened, and outside air is supplied into the combustion chamber 28 by ram pressure through each of the intake ports 37 and 38. In this case, similarly to the second operation mode, the fuel-air mixture is compressed in the combustion chamber 28 by the collision of the streams of outside air introduced into the combustion chamber 28 from each of the intake ports 37 and 38. Thereby, the fuel-air mixture in the combustion chamber 28 is combusted and exploded due to an increase in the pressure, temperature, and density of the fuel-air mixture, and the combustion gas is discharged to the outside of the engine 10 through the exhaust port 74, so that a thrust force of the movable body is obtained.

Note that, in the third operation mode, the intake sub-ports 38 can also be always closed. In this case, the intake main port 37 and the exhaust port 74 are always opened.

Further, in the case where the engine body 11 is configured such that, at the time of landing of the movable body, the piston 35 is made movable in the front back direction so as to enable the piston 35 to be reciprocated by rotation of the wheels at the time of landing, it is also possible to adopt a braking mechanism which uses the energy regeneration based on the counter-electromotive force of the power source 96 used for starting the piston 35.

The switching between the first, second and third operation modes may be automatically performed on the basis of the detection result of the sensor for detecting the speed of the movable body, or can also be manually performed by the operator of the movable body.

Therefore, according to the embodiment configured as described above, it possible to obtain effects that the speed range from the speed applicable to an automobile to the speed applicable to a supersonic plane can be covered by one engine 10 without combination use of engines having a plurality structures, and that the engine 10 can be used as a power source of a movable body capable of traveling on the ground and flying in the air.

Further, the engine body 11 is configured such that outside air is introduced from the plurality of places in the combustion chamber 28, and such that the streams of outside air ejected from the plurality of places are made to collide with each other at one place. Therefore, even in the pressure of outside air introduced into the engine 10 in the movable body flying at a subsonic speed, a compression state necessary for the flight of the movable body can be obtained in the combustion chamber 28 without need of compression mechanisms, such as a compressor and a turbine, which are indispensable for a conventional jet engine. Therefore, this configuration can contribute to reduction in the size and weight of the engine 10.

Note that the intake main port 37 and the intake sub-port 38 are not limited to the above-described shape and arrangement, and any configuration may be used as long as the configuration makes it possible that outside air is ejected from each of a plurality of places to a fixed area in the combustion chamber 28, and that the ejected air streams are made to collide with each other in the fixed area so as to be compressed. In other words, various configurations can be adopted as long as each of the configurations has the functions that a plurality of ejected air streams can be made to collide with each other in a fixed area in the combustion chamber 28, and that the gas in the combustion chamber 28 can be compressed by the shock waves, pressure waves or sound waves generated by the collision of the ejected air streams.

Here, in order to stabilize the compression, it is preferred that the ejection opening 47 is provided at three or more places arranged symmetrically about the central axis L of the combustion chamber 28. In particular, according to the experiment of the present inventors, it was proved that, when the ejection opening 47 is provided at six or more places, the compression ratio of the gas in the combustion chamber 28 is significantly improved. In short, it is preferred that the ejection openings 47 can three-dimensionally eject outside air from the periphery of the fixed area so as to surround colliding streams formed at the collision point P in the combustion chamber 28.

Further, various shapes can be adopted as the shape of the ejection opening 47, as long as each of the shapes makes it possible that the streams of outside air taken from the intake sub-ports 38 are throttled and ejected into the combustion chamber 28, so as to form colliding streams sufficient for combustion. However, in order to increase the compression effect in the combustion chamber 28, it is preferred that the ejection opening 47 is formed to have a non-circular shape, such as an elliptical shape.

Further, it is also possible to adopt a configuration in which spirally rotating streams are formed at the collision point P by making the streams ejected from the respective ejection openings 47 collide with each other in the state of being slightly shifted from each other at the collision point P. Thereby, the combustion can be stabilized against disturbance.

Further, it is also possible to adopt a configuration in which the collision point P is formed at a plurality of places along the central axis L of the combustion chamber 28 so as to enable the streams of outside air ejected from the respective ejection openings 47 to collide with each other at each of the collision points P at the same time or with time differences therebetween. Thereby, it is possible to further increase the compression ratio of the gas in the combustion chamber 28.

Further, it is also possible that a plurality of ejection opening groups, each including a plurality of the ejection openings 47, are set beforehand, and that the timing of ejecting outside air to the collision point P from the ejection openings 47 of each of the ejection opening groups is controlled by the operation control device 36 so that colliding streams are formed for each of the ejection opening groups with time differences between the ejection opening groups. Thereby, the expansion of gas at the time of combustion due to the colliding streams formed at a timing can be suppressed by the colliding streams formed at the subsequent timing, and thereby the generation of noise due to gas expansion at the time of combustion can be suppressed. Therefore, it is preferred that the time difference between the timing of generation of colliding streams by one ejection opening group and the timing of subsequent generation of colliding streams by the other ejection opening group is set so that the gas expansion due to combustion at the former timing can be suppressed by the colliding streams generated at the subsequent timing.

Further, the structure for switching between the opened and closed states of the intake main port 37, the intake sub-ports 38, and the exhaust port 74 is not limited to the above-described structure, as long as the switching can be performed as described above according to an engine output. Therefore, the design of the structure for the switching can be variously changed.

Further, the control device 97 of the operation control device 36 can also perform operation control of the main intake opening and closing member 49, the sub-intake opening and closing member 50, the intermediate member 64, and the piston 35 so that the main intake opening and closing member 49, the sub-intake opening and closing member 50, the intermediate member 64, and the piston 35 are set in the next states so as to correspond to the space flight mode for performing space flight. That is, in the space flight mode, the piston 35 is repeatedly moved in the front and back direction by the power from the power source 96 so as to increase and decrease the capacity in the combustion chamber 28, and also the intake main port 37 and the exhaust port 74 are always opened. At this time, the intake sub-ports 38 are repeatedly opened and closed by the operation of the sub-intake opening and closing member 50, so that outside air is intermittently supplied into the combustion chamber 28 from the intake sub-ports 38. Therefore, in the space flight mode, the intermittent compression of the fuel-air mixture in the combustion chamber 28 by the operation of the piston 35, the compression by the colliding streams intermittently generated at the collision point P, and the compression by ram pressure by the outside air introduced from the intake main port 37 are simultaneously performed. Here, as the space flight mode, a mode may also be adopted in which one of the compression of the fuel-air mixture in the combustion chamber 28 by the operation of the piston 35, and the compression by the colliding streams intermittently generated at the collision point P is performed simultaneously with the compression by ram pressure by the outside air introduced from the intake main port 37.

Further, in the engine 10, when hydrocarbon fuel or hydrogen is used as fuel, and when a catalyst made of platinum, nickel, palladium, or sulfur is also used, cold nuclear fusion can be conducted in the absence of oxygen, and thereby a thrust force is obtained in the absence of oxygen, so that space flight is made possible by an engine having a simpler configuration.

Further, it is preferred that a flow passage, through which at least a part of the combustion gas discharged from the combustion chamber 28 is returned to the inside of the combustion chamber 28, is provided in a part of the flow passage of the combustion gas, which flow passage includes the exhaust port 74. Thereby, the exhaust characteristic can be improved, and also the compression effect in the combustion chamber 28 can be further improved.

Further, when the engine 10 is used only for the purpose of obtaining a thrust force mainly for flight of an airplane or a rocket, the piston 35 and the members associated with the piston 35 may be omitted. That is, when the piston 35 is also used, the engine 10 can be configured as a highly efficient engine for an automobile, while in the case where the engine 10 is used for an airplane, and the like, even when the piston 35 is not provided, the engine 10 can perform operations from starting to high-speed flight.

Further, the configuration of each of the parts of the apparatus according to the present invention is not limited to the illustrated configuration example, and various modifications can be made as long as substantially similar operating effects can be obtained.

REFERENCE SIGNS LIST

10 Engine
28 Combustion chamber
29 Outside air introduction part
35 Piston
36 Operation control device
37 Intake main port
38 Intake sub-port
47 Ejection opening
49 Main intake opening and closing member
50 Sub-intake opening and closing member
64 Intermediate member (exhaust opening and closing member)
74 Exhaust port
L Central axis
P Collision point

The invention claimed is:

1. An engine including a combustion chamber in which a mixture obtained by mixing fuel with outside air is combusted, and an outside air introduction part which introduces outside air into the combustion chamber,
  wherein the outside air introduction part includes a plurality of ejection openings that eject the outside air toward a fixed area in the combustion chamber, said outside air introduction part being configured to eject said outside air via said ejection openings as air streams that compress the outside air in the fixed area by making the streams of outside air ejected from the respective ejection openings collide with each other in the fixed area,
  wherein each of said ejection openings extends axially through an outer peripheral wall of the combustion chamber and is directed towards a central longitudinal axis of said combustion chamber and said combustion chamber is free from obstruction axially interior to said plurality of ejection openings from said outer peripheral wall to said central longitudinal axis such that the outside air streams flow unobstructed from said ejections openings to the central longitudinal axis and directly collide with each other at the central longitudinal axis of the combustion chamber, and
  wherein said plurality of ejection openings includes three or more ejection openings that are arranged substantially symmetrically at three or more radial positions around the central longitudinal axis of the combustion chamber at substantially regular intervals, whereby said three or more ejection openings eject the outside air three-dimensionally around the periphery of the combustion chamber towards the central longitudinal axis, and
  further comprising a piston capable of being operated to enable the capacity in the combustion chamber to be changed:
  wherein the piston is movable in a first operation mode with the required engine output set to be lowest, and is stoppable in a second operation mode with the required engine output set higher than the required engine output of the first operation mode and in a third operation mode with the required engine output set higher than the required engine output of the second operation mode, and
  wherein the engine provides, in the first operation mode, extraction of power by the operation of the piston caused by combustion of the fuel-air mixture, and, in the second and third operation modes, extraction of the thrust force generated by combustion of the fuel-air mixture.

2. The engine according to claim 1,
  further comprising the engine automatically and electronically control the ejection condition of outside air from the ejection openings,
  wherein the operation control device is configured to control the ejection timing of the outside air from each of the ejection openings such that the outside air is intermittently ejected from each of the ejection openings such as to intermittently generate the colliding streams in the fixed area.

3. The engine according to one of claim 1 and claim 2,
  wherein the outside air introduction part includes an intake main port configured to guide outside air into the combustion chamber from a direction along the central longitudinal axis of the combustion chamber, and intake sub-ports configured to guide outside air into the combustion chamber from a periphery of the central longitudinal axis toward the central longitudinal axis, and
  wherein the ejection openings eject the outside air from the intake sub-ports to the fixed area.

4. The engine according to claim 3, wherein the intake sub-ports are formed to have a passage sectional area gradually reduced toward the ejection openings.

5. The engine according to claim 3, further comprising the engine automatically and electronically operating predetermined members and to control the operations of the predetermined members,
  wherein the outside air introduction part further includes a main intake opening and closing member configured to open and close the intake main port, and a sub-intake opening and closing member configured to open and close the intake sub-ports, and
  the engine automatically and electronically control operations of the main intake opening and closing member and of the sub-intake opening and closing member so as to switch between the opened and closed states of the intake main port and of the intake sub-ports according to a required engine output.

6. The engine according to claim 5, wherein the engine automatically and electronically controls operations of the main intake opening and closing member and of the sub-intake opening and closing member such as to intermittently switch between the opened and closed states of the intake sub-ports at a rate corresponding to a required engine output.

7. The engine according to claim 1, wherein the operation control device controls operations of the main intake opening and closing member and of the sub-intake opening and closing member in such a manner that, in the first operation mode, at least one of the intake main port and the intake sub-ports is opened at the time of taking air into the combustion chamber, in the second operation mode, the opened and closed states of the intake sub-ports are intermittently switched at a rate corresponding to a required engine output, and in the third operation mode, at least the intake main port is always opened.

8. The engine according to claim 7, further comprising an exhaust port configured to guide the combustion gas in the combustion chamber to the outside, and an exhaust opening and closing member configured to open and close the exhaust port,
wherein, in the first operation mode, the operation control device opens the exhaust port only in the process of discharging the combustion gas from the combustion chamber, and in the second and third operation modes, the operation control device controls the operation of the exhaust opening and closing member such as to always open the exhaust port.

9. The engine according to one of claim 1 and claim 2, wherein the ejection openings are formed at a projecting portion projecting toward the inner side from the wall surface of the combustion chamber, and the projecting portion has a wing shape capable of suppressing separation of the air stream in the combustion chamber.

10. The engine according to claim 1, wherein the ejection openings are provided at six or more places.

11. The engine according to one of claim 1 and claim 2, wherein the ejection openings are shaped to throttle the introduced outside air and to eject the throttled outside air.

12. The engine according to one of claim 1 and claim 2, comprising the engine automatically and electronically controlling operations of the piston and of members for changing the ejection state of outside air from the ejection openings,
wherein the outside air introduction part includes an intake main port configured to guide outside air into the combustion chamber from a direction along central longitudinal axis of the combustion chamber, and intake sub-ports configured to guide outside air into the combustion chamber toward the central longitudinal axis from the periphery of the central longitudinal axis,
wherein the ejection openings eject the outside air from the intake sub-ports to the fixed area, and
wherein the engine automatically and electronically perform operation control in a space flight mode that simultaneously performs the compression by ram pressure generated by introducing at least outside air from the intake main port, and one or both of the compression by the operation of the piston, and the compression by colliding streams intermittently generated in the fixed area by intermittently ejecting the outside air from the respective ejection openings.

13. The engine according to one of claim 1 and claim 2, wherein the respective ejection openings are configured such that the streams of outside air ejected from the respective ejection openings collide with each other in states of being slightly shifted from each other, such as to form a spirally rotating stream in the fixed area.

14. The engine according to one of claim 1 and claim 2, wherein, in the combustion chamber, a mixture of the outside air with hydrocarbon fuel or hydrogen is combusted in the state where platinum, nickel, palladium, or sulfur is used a catalyst.

15. The engine according to one of claim 1 and claim 2, wherein the respective ejection openings are configured to cause the outside air streams to collide with each other at a plurality of places located along the central longitudinal axis of the combustion chamber.

16. The engine according to one of claim 1 and claim 2, further comprising an exhaust port configured to guide the combustion gas in the combustion chamber to the outside, and a flow passage configured to enable at least a part of the combustion gas discharged from the exhaust port to be returned to the inside of the combustion chamber.

17. The engine according to one of claim 1 and claim 2, further comprising the engine automatically and electronically controlling the ejection state of outside air from the ejection openings,
wherein the ejection openings are arranged at four or more places, and
the engine automatically and electronically controls the timing of ejecting the outside air from the respective ejection openings in such a manner that a plurality of ejection opening groups each consisting of a plurality of ejection openings are set, and the streams of outside air ejected from the ejection openings of each of the ejection opening groups are made to collide with each other with time differences between the respective ejection opening groups.

18. An engine comprising: a combustion chamber configured to enable therein combustion of a mixture obtained by mixing fuel with outside air; an outside air introduction part configured to introduce outside air into the combustion chamber; and the engine automatically and electronically operate predetermined members and to control the operation of the predetermined members,
wherein the outside air introduction part includes an intake main port configured to guide outside air to a fixed area in the combustion chamber from a direction along a central longitudinal axis of the combustion chamber, intake sub-ports configured to guide outside air into the combustion chamber from the direction toward the central longitudinal axis through a plurality of ejection openings, a main intake opening and closing member configured to open and close the intake main port, and a sub-intake opening and closing member configured to open and close the intake sub-ports,
the engine automatically and electronically controls operations of the main intake opening and closing member and of the sub-intake opening and closing member such as to cause the opened and closed states of the intake main port and of the intake sub-ports to be switched according to a required engine output,
wherein each of said ejection openings extends axially through an outer peripheral wall of the combustion chamber and is directed towards the central longitudinal axis of said combustion chamber and said combustion chamber is free from obstruction axially interior to said plurality of ejection openings from said outer peripheral wall to said central longitudinal axis such that the outside air streams flow unobstructed from said ejections openings to the central longitudinal axis and directly collide with each other at the central longitudinal axis of the combustion chamber, and wherein said plurality of ejection openings includes three or more ejection openings that are arranged substantially symmetrically at three or more radial positions around the central longitudinal axis of the combustion chamber at substantially regular intervals, whereby said three or more ejection openings eject the outside air three-dimensionally around the periphery of the combustion chamber towards the central longitudinal axis, and further comprising a piston capable of being operated to enable the capacity in the combustion chamber to be changed:

wherein the piston is movable in a first operation mode with the required engine output set to be lowest, and is stoppable in a second operation mode with the required engine output set higher than the required engine output of the first operation mode and in a third operation mode with the required engine output set higher than the required engine output of the second operation mode, and wherein the engine provides, in the first operation mode, extraction of power by the operation of the piston caused by combustion of the fuel-air mixture, and, in the second and third operation modes, extraction of the thrust force generated by combustion of the fuel-air mixture.

19. The engine according to claim 18, wherein the engine automatically and electronically controls operations of the main intake opening and closing member and of the sub-intake opening and closing member to cause the opened and closed states of the intake sub-ports to be intermittently switched at a rate according to a required engine output.

20. A method of using the engine according to claim 1, comprising:
ejecting outside air into the combustion chamber from the plurality of ejection openings toward the fixed area in the combustion chamber such that the streams of outside air ejected from the respective ejection openings collide with each other in the fixed area.

21. The method according to claim 20, further including that the streams of outside air ejected from the respective ejection openings directly collide with each other in the fixed area at the central longitudinal axis of the combustion chamber.

22. The engine according to claim 1, wherein colliding air streams ejected from said ejection openings compress the air without a separate compressor or turbine.

23. The engine according to claim 18, wherein colliding air streams ejected from said ejection openings compress the air without a separate compressor or turbine.

* * * * *